US 6,591,567 B2

(12) United States Patent
Hota et al.

(10) Patent No.: US 6,591,567 B2
(45) Date of Patent: Jul. 15, 2003

(54) LIGHTWEIGHT FIBER REINFORCED POLYMER COMPOSITE MODULAR PANEL

(75) Inventors: GangaRao V. S. Hota, Morgantown, WV (US); Siva Ram V. Hota, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 10/013,768

(22) Filed: Dec. 10, 2001

(65) Prior Publication Data

US 2002/0062607 A1 May 30, 2002

Related U.S. Application Data

(60) Provisional application No. 60/254,486, filed on Dec. 9, 2000.

(51) Int. Cl.$^7$ ................................................. E04C 3/00
(52) U.S. Cl. .................... 52/578; 52/588.1; 52/581; 52/592.1; 52/782.1; 14/3; 14/7; 14/13; 14/14; 14/73
(58) Field of Search .................... 52/177, 179, 180, 52/181, 581, 582.1, 588.1, 782.1, 783.1, 592.1, 592.4, 650.3, 731.2, 731.3, 731.6, 732.1, 732.2, 578, 586.2, 793.1, 793.11, 586.1, 783.11, 783.17; 14/3, 7, 13, 14, 73

(56) References Cited

U.S. PATENT DOCUMENTS 5,651,154 A * 7/1997 Ahlskog et al. .................. 14/6
5,836,029 A * 11/1998 Garber et al. ................. 14/77.1
6,250,037 B1 * 6/2001 Ezumi et al. ............... 52/592.1
6,309,732 B1 * 10/2001 Lopez-Anido et al. ...... 428/178
6,455,131 B2 * 9/2002 Lopez-Anido et al. ...... 428/178

FOREIGN PATENT DOCUMENTS

EP          0188395 A2 *  7/1986
GB          2126106     *  3/1984

\* cited by examiner

*Primary Examiner*—Jeanette Chapman
(74) *Attorney, Agent, or Firm*—Steptoe & Johnson PLLC (57) ABSTRACT

A modular fiber reinforced polymer (FRP) module that interlocks with other similarly designed modules. Specifically, each FRP module has a female, receiver, end and a male, inserter, end such that the inserter of a first FRP module interlocks with, or "snaps into" or "slids into," a receiver of an adjacent second FRP module. Once interlocked, the two connected FRP modules are further secured by either adhesive and/or thermal connections. An FRP module is made of multiple layers of multi-axial fiber reinforcement and a resin matrix, the layers being continuous throughout the entire shape of the module. An overlay may be placed over the top face of one or more FRP modules joined together to provide a uniform surface. In addition, one or more exterior FRP composite laminates, grids, plates or fabrics may be bonded continuously to the top face. In certain embodiments, one or more of the internal spaces of a FRP module may be filled with a filler for thermal insulation, noise reduction insulation, or a strength and stability enhancement of the FRP module.

39 Claims, 3 Drawing Sheets

LIGHTWEIGHT FIBER REINFORCED POLYMER COMPOSITE MODULAR PANEL

CROSS-REFERENCE TO RELATED APPLICATIONS

This application claims the benefit of U.S. application Ser. No. 60/254,486, filed Dec. 9, 2000.

BACKGROUND OF THE INVENTION

1. Field of the Invention

This invention relates to fiber reinforced polymer (FRP), and more specifically, to lightweight FRP composite decks for structural support systems or FRP walls for soil or other retaining systems, and to methods for manufacturing and installing lightweight FRP composite decks or walls.

2. Related Art

Structural panels are continually needed in constructing and repairing walls, floors, decking, bridges, roofs, and the like. In the prior art, conventional construction materials, e.g., steel, concrete, and wood, are used for high performance deck and wall structures because such materials typically have a high load bearing capacity.

There are several disadvantages associated with using such conventional construction materials in structural panels. First, such structural panels have a short service life in that they degrade over time: steel panels corrode, concrete panels spall such that they require repair or replacement every ten to fourteen years, and wood panels rot. Second, such structural panels tend to be very heavy in order to achieve the required load bearing capacity for the specific application. Third, such structural panels require a long time for creation and erection because they are typically built and installed on site.

To accommodate some of the disadvantages with conventional construction materials, the prior art includes fiber reinforced polymer (FRP) composite materials made with a honeycomb core and an outer skin which absorb water with time. In addition, panels made of conventional FRP composite materials have lineal profiles mainly reinforced with continuous fibers in the axial or long direction.

There are several disadvantages associated with using such conventional FRP materials in structural panels. First, although conventional FRP composite materials are lightweight, they lack the required load-bearing capacity to handle high performance deck and wall structures. Therefore, conventional FRP composite materials are used only for light duty floor systems and building panels. Second, conventional FRP composite panels without fiber continuity between the core and outer skin often develop moisture ingress and resin-dominated failure with respect to the honeycomb core and outer skin. Third, the lineal profile and primary use of continuous fibers in the axial direction result in a reduced load bearing capacity.

Therefore, there is a need for a FRP composite panel that is lightweight, yet has a high load rating due to high strength to weight ratio. There is a further need for a FRP composite panel that has a long service life due to its resistance to corrosion There is still a further need for a FRP composite panel that is easy and quick to erect and become operational.

There is also a need for a FRP composite deck or wall system that is lightweight, yet can withstand the heavy loads associated with highway, retaining walls, bridges, bridge abutments, and decking systems. The FRP composite deck or wall systems must also have a long service life and be prefabricated to allow for easy and quick installation.

One panel and deck system addressing these needs is the FRP panel disclosed in U.S. Pat. No. 6,309,732. Although this '732 panel resolves many of the disadvantages with the other conventional panel and deck systems, there is still a need to further improve the FRP panel. In one embodiment, the '732 panel system comprises two separate locking pieces: a double trapezoid component and a hexagon component, wherein the hexagon component is used to interlock two adjacent double trapezoid components. This interlocking and assembly of a deck system using the '732 components is very straightforward; however, there is still a need to improve the time and effort required for assembly of a deck or panel.

SUMMARY OF THE INVENTION

The lightweight FRP composite modular panel ("Modular Panel") of the present invention solves the problems and disadvantages of conventional structural panels by providing a FRP composite module that interlocks with other similarly designed modules. Specifically, each FRP module has a female, receiver, end and a male, inserter, end such that the inserter of a first FRP module interlocks with, or "snaps" or "slides" into, a receiver of an adjacent second FRP module. Once interlocked, the two connected FRP modules are further secured by either adhesive, mechanical and/or thermal connections.

The FRP modules are snapped together and used for infrastructure and constructed facilities such as heavy duty interstate bridge decks, lightweight bridge deck for secondary roadway bridge structures, floating off-shore platforms, ship decks, bridge decks, wall/floor/roof panels, sound barriers, and trench support reinforcements. Optionally, an application of FRP modules may further comprise filling the interior spaces of the FRP modules with foam, concrete or soil for better insulation and energy absorption (such as for vehicle bumper beams and guard railings), or stability for soil retaining structures.

The fiber architecture of a FRP module comprises multiple layers of multi-axial stitched fabrics, unidirectional rovings, woven cloth, and mats, preferably using glass or carbon fibers with a general purpose resin. The fiber architecture is continuous throughout the design of a FRP module such that a FRP module is a single, integral component and not comprised of separate pieces of fabric attached together. This fiber continuity through a FRP module provides adequate fiber reinforcement along main stress paths. In addition, a FRP module is manufactured using the conventional methods of the Seeman Composite Resin Infusion Molding Process (SCRIMP), Vacuum Assisted Resin Transfer Molding (VARTM), or pultrusion process.

The design of the FRP module of the present invention provides distinct advantages over the prior art. First, the shape of the FRP module lends itself to optimally place fabrics for maximum structural resistance. Second, the use of glass fiber reinforced thermoplastic rods with whiskers which melt during curing reinforce the intersections in the FRP module, ensure a better bond with other fabrics, and minimize voids where resin flow is most difficult. Third, the FRP module provides a lightweight, strong and durable structure that will not corrode like steel, spall like concrete, or rot like wood. The present design also provides a fiber and matrix architecture with inherent material properties that provide a high strength and stiffness to weight ratio, good fatigue resistance, and good corrosion resistance, thereby improving durability.

The panels and deck system made with the FRP modules of the present invention have a long service life and a reduced maintenance cost due to these fatigue and corrosion resistant properties, such that the life of a FRP module of the present invention can be approximately fifty years or better. This is accomplished by the fact that a deck made from FRP modules of the present invention is nearly ten times lighter than a traditional concrete bridge deck. Since the underlying support beams do not have to carry as much dead load, more live load can be applied giving the bridge a higher AASHTO rating.

The design of the FRP module also improves the performance of the structure over the prior art by addressing a common failure—web buckling. The instant design incorporates a diagonal web that connects a first and second vertical web, thereby reducing the unbraced length of the vertical webs. This in turn reduces the vertical webs' buckling tendency. For example, the present FRP module design meets any of the general force transfer mechanisms, including AASHTO HS-25 truckload requirements.

The FRP modules of the present invention also have enhanced load bearing and interlocking capacity as compared with conventional FRP floor systems and building panels. The high load ratings are due to the high strength to weight ratio of the FRP modules, resulting in a panel or deck system employing the present FRP modules having higher load capacity than a reinforced concrete deck with much lower self weight. Further, stiffness of FRP modules in the direction perpendicular to traffic is adequate to provide the transverse load distribution to supporting beams.

The fiber architecture of the present invention is reinforced with heavy multi-axial stitched fabrics, continuous rovings, woven cloth and mats resulting in superior mechanical properties as compared to existing FRP composite lineal profiles. In addition, the composite fiber architecture overcomes the problems associated with moisture ingress and resin-dominated failure observed in panels with honeycomb core and outer skins.

FRP modules of the present invention can be properly designed, fabricated, and installed very efficiently. Such FRP modules can be used to replace deteriorated concrete or timber decks or to build new panel and deck systems. Further, such FRP modules can be assembled with composite stiffening beams to develop an all-composite short-span bridge superstructure.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS a. Structure of FRP Modules

Figure 1:
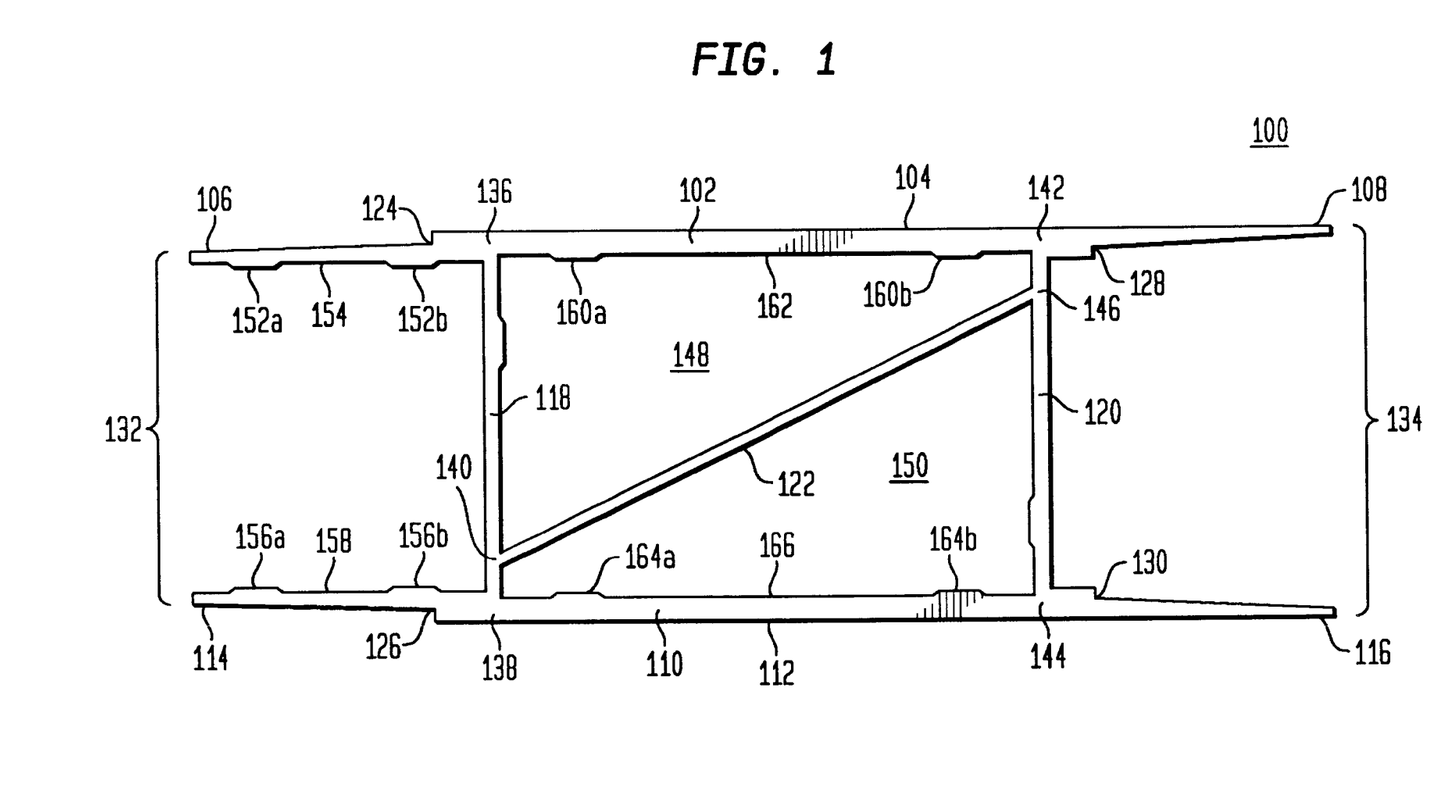
FIG. 1 is a planar view showing a cross section of a fiber reinforced polymer (FRP) module of the present invention.
Figure 2:
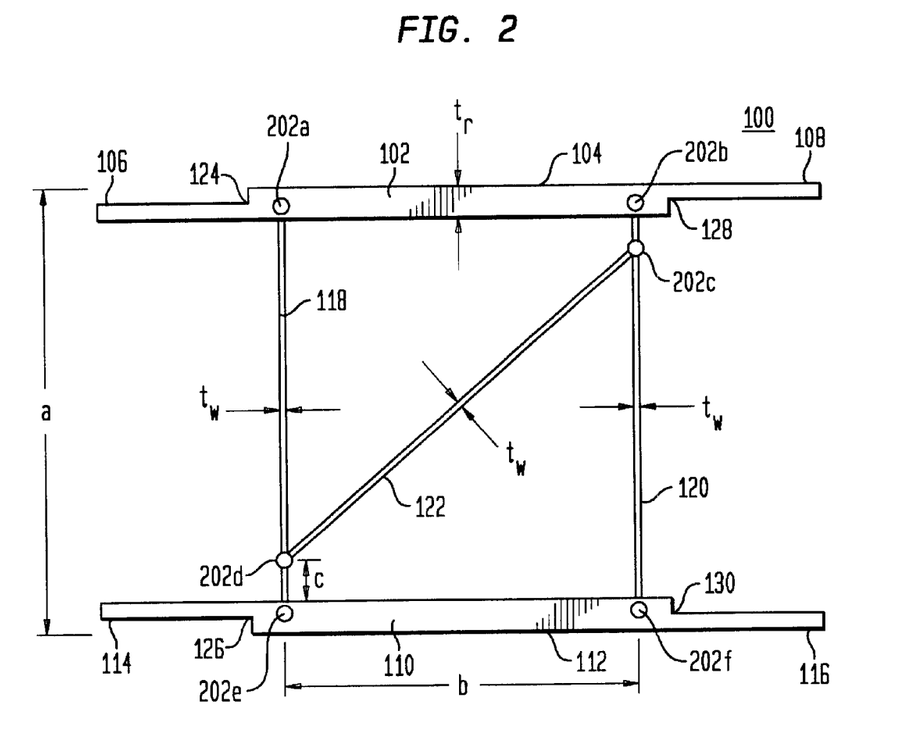
FIG. 2 is a planar view showing the points of intersection on a cross section of the FRP module.
Figure 3:
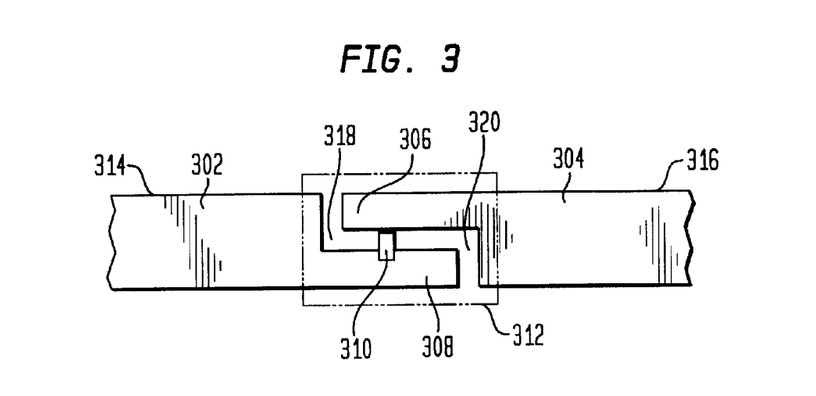
FIG. 3 is a planar view showing a cross section of an interlocking of two adjacent FRP modules.

FIGS. 1–3 show a preferred embodiment of a fiber reinforced polymer (FRP) module 100 of the present invention, wherein, depending on the pultrusion method used for manufacturing, the FRP module 100 can have multiple closed cells to minimize field-joining operations. AFRP module 100 is designed as having a male end, or inserter, 132 and a female end, or receiver, 134 such that adjacent FRP modules 100 interlock, or "snap-fit" or "slide," together by inserting the inserter 132 of a first FRP module 100 into the receiver 134 of a second adjacent FRP module 100. Multiple FRP modules 100 are snapped or slid with chemical bonding material together to create a panel, deck, or wall system of varying width.

The preferred FRP module 100 comprises a top piece 102 having a top face 104, a first end 106 and a second end 108, a bottom piece 110 having a bottom face 112, a first end 114, and a second end 116. The top piece 102 is supported a predefined distance from said bottom piece 110 by two or more webs, such as a first web 118 connecting the top piece 102 at a first intersection 136 to the bottom piece 110 at a second intersection 138, a second web 120 a predefined distance from the first web 118 connecting the top piece 102 at a third intersection 142 to the bottom piece 110 at a fourth intersection 144. The FRP module 100 is described in terms of two vertical webs, first web 118 and the second web 120, for convenience purpose only wherein the first web 118 and the second web 120 are perpendicular to the top piece 102 and the bottom piece 110. It would be readily apparent to one of ordinary skill in the relevant art to use a different number of vertical webs in an alternative embodiment. For instance, one or more additional intermediary webs, also preferably positioned vertically, may be built into the design and manufacturing die for a FRP module 100. These intermediary webs provide greater efficiency, such as, minimizing field-joining operation.

The first web 118 and the second web 120 are supported and strengthened by one or more diagonal webs 122 diagonally connecting the first web 118 at a fifth intersection 140 to the second web 120 at a sixth intersection 146, thereby defining a first internal space 148 and a second internal space 150. The diagonal web 122 supports and stiffens the first web 118 and the second web 120 wherein the fifth intersection 140 and the sixth intersection 146 are positioned at a predefined distance away from the second intersection 138 and the third intersection 142 which are known stress concentration zones. In the preferred embodiment, the fifth intersection 140 and the sixth intersection 146 are located at a distance from the top piece 102 and the bottom piece 110, respectively, equal to about ten percent of the length of the first web 118 and the second web 120.

The FRP module 100 is described in these terms for convenience purpose only. It would be readily apparent to one of ordinary skill in the relevant art to use a different number of webs 118, 120, 122, resulting in a different number of internal spaces 148, 150.

The locking mechanism of the FRP module 100 comprises an inserter 132 and a receiver 134 wherein the inserter 132 of a first FRP module 100 is inserted or slid into the receiver 134 of a second FRP module 100. The extension of the first end 106 of the top piece 102 and the extension of the first end 114 of the bottom piece 110 beyond the first web 118 comprise the inserter 132. The extension of the second end 108 of the top piece 102 and the extension of the second end 116 of the bottom piece 110 beyond the second web 120 comprise the receiver 134. Preferably, the outer width of the inserter 132 is slightly shorter than the inner width of the receiver 134 such that the two FRP modules are connected together partially by the inherent pressure of fitting the inserter 132 of the first FRP module 100 into the receiver 134 of the second FRP module 100.

In addition, the top face 104 of the first end 106 of the top piece 102 has a recessed portion 124 and the bottom face 112 of the first end 114 of the bottom piece 110 has a recessed portion 126. Corresponding to these recessed portions 124, 126, the second end 108 of the top piece 102 has an interior recessed portion 128 and the second end 116 of the bottom piece 110 has an interior recessed portion 130. Thus, when an inserter 132 of a first FRP module 100 is inserted into a receiver 134 of a second FRP module 100, the ends 108, 116 of the receiver 134 are positioned within and aligned with the recessed portions 124, 126 of the inserter 132, and the ends 106, 114 of the inserter 132 are positioned within and aligned with the interior recessed portions 128, 130 of the receiver 134. The shape and design of the inserter 132 and the receiver 134 comprise a "tongue and groove" joint that transfers shear stresses from the first FRP module 100 to the second FRP module 100. Other means for securing the connection between two adjacent FRP modules 100 are described below.

FIG. 3 illustrate the tongue and groove joint 312 of the present invention. As shown, the first end 308 of a top piece 302 of a first FRP module 314 (the "partial inserter") is fitted and interlocked within a second end 306 of a top piece 304 of a second FRP module 316 (the "partial receiver"). Also shown, the second end 306 of the partial receiver of the second FRP 316 is positioned within and aligned with the recessed portion 318 of the partial inserter of the first FRP 314, and the first end 308 of the partial inserter of the first FRP module 314 is positioned within and aligned with the interior recessed portion 320 of the partial receiver of the second FRP module 316.

The dimensions of the FRP module 100, including the thickness of the various parts of the FRP module 100, are determined and adjusted as needed to obtain the maximum bending and torsional efficiency for the intended application the FRP module 100. As shown in FIG. 1, both the top piece 102 and the bottom piece 110 of the FRP module 100 are thicker at the center and thinner at the ends 106, 108, 114, 116, respectively. For example, in an application for a deck panel used in bridges, a FRP module 100 has the following dimensions:

- overall width of the first piece 102 and second piece 110=24 inches
- overall height "a"=8 inches
- overall length=as required by application, but preferrably between 14–40 feet
- distance between first web and second web=11.3 inches
- distance from edge of first end of top piece to recessed portion=5 inches
- distance from edge of second end of top piece to internal recessed portion=5 inches
- length of a protrusion area=1.18 inches
- thickness of first end 106 and second end 108 of top piece 102=0.24 inches
- thickness of center of top piece 102=0.48 inches
- thickness of first end 114 and second end 116 of bottom piece 110=0.24 inches
- thickness of center of bottom piece 110=0.48 inches
- thickness of first web 118 and second web 120=0.35 inches
- thickness of diagonal web 122=0.25 inches These dimensions are for convenience purpose only. It would be readily apparent to one of ordinary skill in the relevant art to design, manufacture, and use a comparable FRP module 100 having different dimensions.

Figure 4:
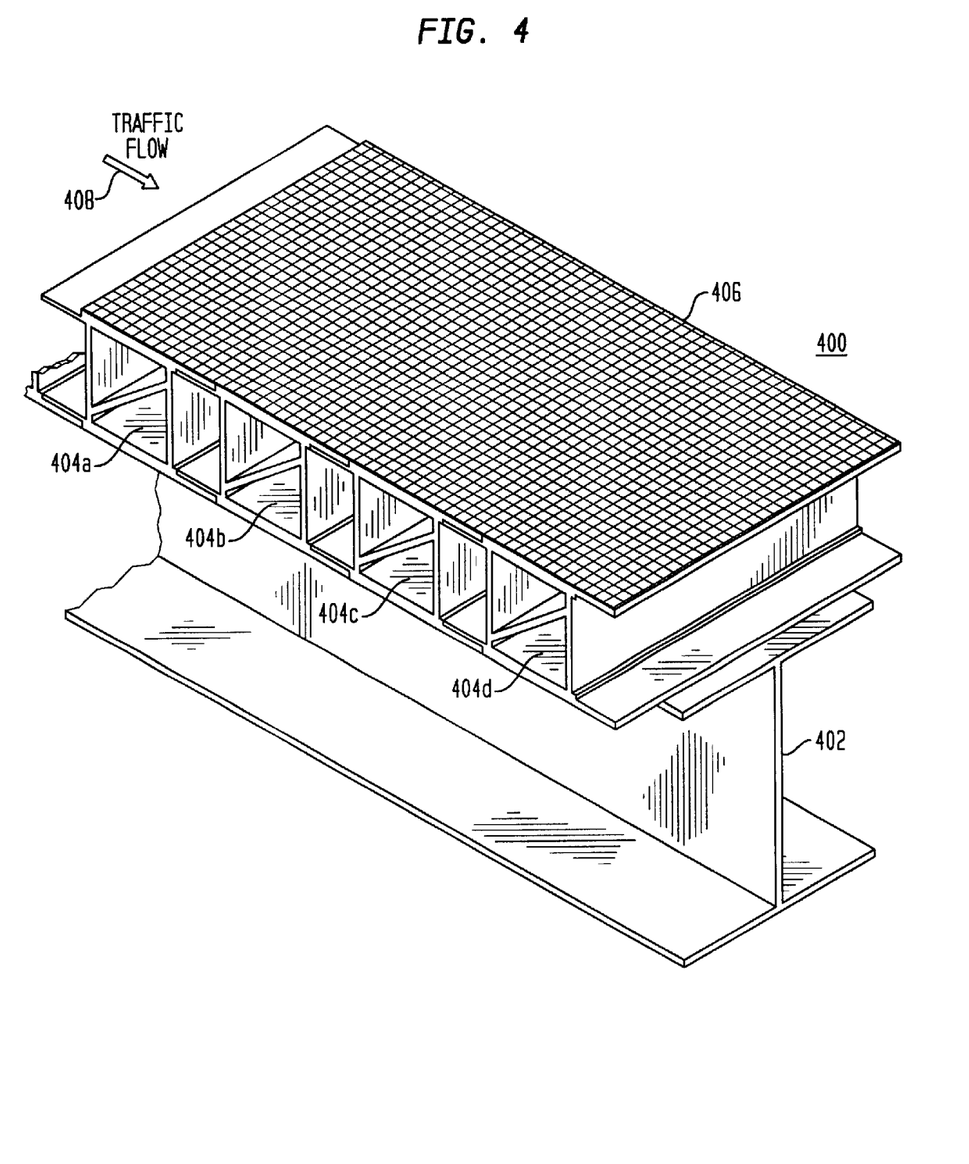
FIG. 4 is a perspective view of a plurality of FRP modules assembled into a deck and supported on a beam.

In operation, when building a composite panel or deck system of the present invention, see FIG. 4, two FRP modules 100 are connected together by inserting the inserter 132 of a first FRP module 100, e.g., FRP module 404b, into the receiver 134 of a second FRP module 100, e.g., FRP module 404a. The two FRP modules 404a,b are held together by the pressure lock of the inserter 132 within the receiver 134.

Additionally, in joining two FRP modules 404a,b, an adhesive is used such that the bonding surface of the two FRP modules 404a, b and the adhesive carry shear force of the joined FRP modules 404a,b, thereby contributing to the interlocking, or joining, system. In the preferred embodiment, the adhesive is a commercially available polymer system for bonding FRP to FRP with proven properties. It would be readily apparent for one of ordinary skill in the art to select and use the appropriate adhesive bonding system.

In addition, a conventional thermoplastic rod 310 is used to strengthen the interlocking of the first FRP module 404b with the second FRP module 404a. The thermoplastic rod 310 extends the about the entire length of a FRP module 404a, b and contains a small diameter steel rod embedded therein. Once the inserter 132 of the first FRP module 404b is inserted into the receiver 134 of the second FRP module 404a, the steel rod is charged, thereby melting the thermoplastic rod 310 and further securing the interlocking of the two FRP modules 404a,b.

Furthermore, the intersections 136, 138, 140, 142, 144, and 146 of a FRP module 100 can be strengthened by using multiple thermoplastic rods 310 as described above. In this instance, a thermoplastic rod 202a–f is used at each of the intersections 136, 138, 140, 142, 144, and 146 of a FRP module 100. This reinforcement of intersections 136, 138, 140, 142, 144, and 146 (and reentrant corners) enhances the strength and durability of these known stress points, as well as, ensures better bonds with other fabrics of the FRP module 100 and minimizes voids where resin flow is most difficult.

In the preferred embodiment, the FRP module 100 of the present invention is made of a plurality of commercially available fiber layers in the form of rovings, unidirectional rovings, multi-axial fabrics, biaxial fabrics, and quadraxial fabrics. The resin holding the fiber layers together is a commercially available polyester, vinyl ester, epoxy or phenolic resin that is resistant to both harsh environmental conditions and weather effects. It would be readily apparent to one or ordinary skill in the relevant art, to design and manufacture a FRP module 100 composite fiber architecture suitable for a particular application.

Also in the preferred embodiment, the matrix, or resin after curing, holding the fabric layers together is determined by the specific application of the resulting FRP composite panel or deck system. For example, vinyl ester resin is used for exposure to harsh environments such as for a highway bridge. A polyester resin is used for buildings and other internal wall/flooring structures. Phenolic resin is used for applications with strict fire specifications. Fire retardant additives, ultra violet inhibitors, as well as other additives and fillers may also be added to the resin. Vinyl ester, polyester, and phenolic resin systems are commercially available and are well known in the relevant arts. It would be readily apparent for one of ordinary skill in the relevant art to use these, or comparable, resins for a specific application of the FRP composite deck system.

To facilitate the manufacturing of a FRP module 100, the FRP module 100 has four indentation areas 154, 158, 162 and 166, wherein each indentation area, e.g., indentation area 154, is defined by a first protrusion area 152*a* and a second protrusion area 152*b*. When manufacturing a FRP module 100 using multiple layers of fabric, the beginning edge of a fabric layer and an ending edge of the fabric layer are positioned within one of these protrusion areas 152, 156, 160 and 164. Hence, it is the overlapping of the edges of a fabric layer that creates a protrusion area 152, 156, 160, and 164. This positioning ensures that the layer of fabric does not "bunch" or otherwise interfere with the design and operation of the FRP module 100. The other advantages to the positioning of overlapping edges of layers of fabric within these protrusion areas 152, 156, 160 and 164 are that this extra thickening of certain areas of a FRP module 100 reinforces critical stress areas of the FRP module 100 resulting from proximity to corners or intersections and reinforces the area of where two adjacent FRP modules 100 are interlocked.

In an alternative embodiment, one or more of the internal spaces 148, 150 are filled with a filling material for the purpose of noise reduction, thermal insulation, strength enhancement, stability enhancement, or for a comparable purpose. It would be readily apparent to one of ordinary skill in the relevant art to select an appropriate filling material and fill one or more of the internal spaces 148, 150 of the FRP module 100.

FIG. 4 illustrates a plurality of FRP modules 404*a–d* interlocked together and supported on a beam 402 to create a bridge deck 400. In operation on a highway or bridge, the FRP modules 404*a–d* are placed typically perpendicular to the automobile traffic flow 408 and supported by one or more beams 402 that are placed parellel to the traffic flow 408. The use of one or more beams 402 are optional and are required only if the specific application of the FRP modules 404*a–d* require such additional support. In the preferred embodiment of the present invention, the beams are spaced up to nine (9) feet apart. It would be readily apparent to one of ordinary skill in the relevant art to use steel, concrete, wood, FRP composite or comparable support, beams and to space the beams at other distances.

As shown, the bridge deck 400 comprises one or more FRP modules 404*a–d* interlocked together as described above by inserting an inserter 132 of one FRP module 100, e.g., FRP module 404*b*, into a receiver 134 of an adjacent, second FRP module 100, e.g., FRP module 404*a*, and further employing an adhesive along the bonding surfaces and the melting of one or more thermoplasic rods. The preferred embodiment of the present invention places a suitable overlay 406, or wearing surface, e.g., concrete, asphalt, thin polymer concrete, or bonded grid anti-skid surface, on top of the interlocked FRP modules 404*a–d*, thereby creating a uniform and contiguous top surface. The resin binder for a polymer concrete overlay 406 can be polyester or epoxy resin systems.

Alternatively, the overlay 406 may be made of asphalt concrete or Portland cement concrete with appropriate additives or modifiers. The bond between the FRP modules 404*a–d* and the overlay 406 can be enhanced by surface treatment, e.g. sandblasting, and the use of a primer material. In addition, other surface enhancers can be placed over the top side of the bridge deck 400 prior to the overly to improve the bridge deck's 400 strength and durability. For example, one or more of the following may be used: exterior FRP composite laminates, plates, or fabrics bonded continuously to the top side.

It would be readily apparent for one of ordinary skill in the relevant art to use comparable overlays 406, wearing surfaces or layers on top of the interlocked FRP modules 404*a–d*.

b. Fabrication of FRP Modules

The FRP modules 100 of the present invention are designed to be manufacturing transparent. The panels are made using a fiber architecture having a plurality of layers of multi-axial fiber reinforcement in a polymeric resin matrix. A specific fiber architecture is designed according to the needed performance requirements of the structural panels and the cells therein. Fiber architecture, and the design thereof, is well known in the art and there are many commercially available multi-axial fiber reinforcements and polymeric resin matrices. It would be readily apparent to one of ordinary skill in the relevant art to design and manufacture a fiber architecture for a FRP module 100 of the present invention to handle a specific application.

The manufacturing of a FRP module 100 is accomplished using any of the conventional methods of Vacuum Assisted Resin Transfer Molding (VARTM) process, Seeman Composites Resin Infusion Molding Process (SCRIMP) or pultrusion process. VARTM fabrication of parts is accomplished on a single open mold. The process uses the injection of resin in combination with a vacuum and captured under a bag to thoroughly impregnate the fiber reinforcement. Because the initial capital investment is relatively low, manufacturing using VARTM is good for low volume production. SCRIMP allows for the efficient manufacturing process of VARTM to produce large structural shapes that are void free. In addition, SCRIMP is used to make both thin and thick laminates, as well as complex shapes having unique fiber/fabric architectures that have high structural performance. Similar to VARTM, SCRIMP is good for low volume production because of the relatively low initial capital investment. Pultrusion is a continuous molding process that combines fiber reinforcements and thermosetting resins. The pultrusion process is used in the fabrication of composite parts that have a constant cross-section profile. This process is good for high volume production.

In the preferred embodiment, the FRP modules 100 are fabricated by pultrusion. Pultrusion is a continuous process for making a lineal composite profile with a constant cross section. The advantages of pultrusion for mass-production are: (1) low labor cost (the process requires little operator input other than to maintain materials supply), (2) low operating costs, (3) minimal material wastage, and (4) high production rate.

Pultrusion is well known in the relevant art, however conventional uses of pultrusion involve only lightweight fabrics and mats for transverse reinforcement, whereas the FRP modules 100 of the present invention may comprise heavy fabrics. Further, the present invention uses pultrusion for using fabrics continuously throughout the FRP module 100. This continuous use of fabrics eliminates the use of multiple seams thereby improving and strengthening the joints and intersections of the components.

The conventional pultruded panels have been reinforced with unidirectional continuous rovings (a group of untwisted parallel strands). Although, continuous or chopped strand mats (CSM) are used in the conventional pultruded panels to provide a minimum transverse reinforcement, these conventional panels typically lack in transverse fiber reinforcement to provide continuity between the sides of the cells that comprise the panels.

The preferred embodiment of the FRP modules 100 are described in these terms for convenience purpose only. It would be readily apparent for one of ordinary skill in the relevant art to manufacture the FRP modules 100 of a comparable fabric architecture, using a comparable resin matrix and adhesive, and to create a FRP module 100 having different dimensions.

In addition, the preferred embodiment of the FRP module 100 is described in terms of having multiple layers of fabric continuous throughout the entire design and shape of the FRP module 100. However, in alternative embodiments, an FRP module 100 may be constructed from multiple pieces or components that are glued or otherwise connected together, e.g., by mechanical fasteners. Each separate piece of the FRP module 100 would be made of multiple layers of composite fabric held together by a resin.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A fiber reinforced polymer (FRP) module for a panel, deck, or wall system, comprising:
   a top piece having a top face, a length, a width, a thickness, a first end, and a second end;
   a bottom piece having a bottom face, a length, a width, a thickness, a first end, and a second end; and
   a means for supporting said top face a predefined distance from said bottom face;
   wherein said first end of said top face and said first end of said bottom face comprise a receiver having a length and said second end of said top face and said second end of said bottom face comprise an inserter having a length, wherein said length of each said receiver and said inserter is within a range of about 15 percent to about 25 percent of said length of said top piece;
   wherein the FRP module is adapted to be pressure fit to a first adjacent FRP module and a second adjacent FRP module, such that said receiver of the FRP module interlocks with an inserter of said first adjacent FRP module and said inserter of the FRP module interlocks with a receiver of said second adjacent FRP module;
   wherein the FRP module is made of two or more layers of multi-axial fiber reinforced fabric adhered together by a resin matrix, said layers of fabric being continuous throughout the entire shape of the FRP module.

2. The FRP module according to claim 1, wherein said inserter comprises one or more recessed portions and said receiver comprises one or more interior recessed portions such that said inserter and said receiver form a tongue and groove joint when interlocked.

3. A fiber reinforced polymer (FRP) module for a panel, deck, or wall system, comprising:
   a top piece having a top face, a length, a width, a thickness, a first end, and a second end;
   a bottom piece having a bottom face, a length, a width, a thickness, a first end, and a second end; and
   a means for supporting said top face a predefined distance from said bottom face, wherein said means for supporting comprises a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces, wherein said fifth intersection is at a point on said first web between said first intersection and said second intersection and said sixth intersection is at a point on said second web between said third intersection and said fourth intersection;
   wherein said first end of said top face and said first end of said bottom face comprise a receiver having a length and said second end of said top face and said second end of said bottom face comprise an inserter having a length,
   wherein the FRP module is adapted to be pressure fit to a first adjacent FRP module and a second adjacent FRP module, such that said receiver of the FRP module interlocks with an inserter of said first adjacent FRP module and said inserter of the FRP module interlocks with a receiver of said second adjacent FRP module;
   wherein the FRP module is made of two or more layers of multi-axial fiber reinforced fabric adhered together by a resin matrix, said layers of fabric being continuous throughout the entire shape of the FRP module.

4. The FRP module according to claim 3, wherein said first web and said second web are vertically aligned between said top piece and said bottom piece.

5. The FRP module according to claim 3, further comprising:
   a means for reinforcing one or more intersections of the FRP module.

6. A fiber reinforced polymer (FRP) module for a panel, deck, or wall system, comprising:
   a top piece having a top face, a length, a width, a thickness, a first end, and a second end;
   a bottom piece having a bottom face, a length, a width, a thickness, a first end, and a second end;
   a means for supporting said top face a predefined distance from said bottom face, wherein said means for supporting comprises a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces; and
   a means for reinforcing one or more intersections of the FRP module, wherein said means for reinforcing is a thermoplastic rod with whiskers that are melted to bond said layers of fabric at said intersections;
   wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module;
   wherein the FRP module is made of two or more layers of multi-axial fiber reinforced fabric adhered together by a resin matrix, said layers of fabric being continuous throughout the entire shape of the FRP module.

7. The FRP module according to claim 3, further comprising one or more intermediary webs connecting said top piece and said bottom piece positioned between said first web and said second web.

8. The FRP module according to claim 7, wherein said intermediary webs are vertically aligned with said first web and said second web.

9. A fiber reinforced polymer (FRP) module for a panel, deck, or wall system, comprising:

a top piece having a top face, a length, a width, a thickness, a first end, and a second end;

a bottom piece having a bottom face, a length, a width, a thickness, a first end, and a second end;

a means for supporting said top face a predefined distance from said bottom face, wherein said means for supporting comprises a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces;

wherein the FRP module has one diagonal web and the fifth intersection is positioned on said first web a distance from said bottom piece equal to about ten percent of the length of said first web, and the sixth intersection is positioned on said second web a distance from said top piece equal to about ten percent of the length of said second web;

wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module;

wherein the FRP module is made of two or more layers of multi-axial fiber reinforced fabric adhered together by a resin matrix, said layers of fabric being continuous throughout the entire shape of the FRP module.

10. The FRP module according to claim 3, further comprising:

a means for reinforcing an interlocking of said receiver of the FRP module with said inserter of said first adjacent FRP module.

11. A fiber reinforced polymer (FRP) module for a panel, deck, or wall system, comprising:

a top piece having a top face, a length, a width, a thickness, a first end, and a second end;

a bottom piece having a bottom face, a length, a width, a thickness, a first end, and a second end, wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module;

a means for supporting said top face a predefined distance from said bottom face; and a means for reinforcing an interlocking of said receiver of the FRP module with said inserter of said adjacent FRP module, wherein said means for reinforcing comprises a thermoplastic rod having a length, a metal rod in contact with said thermoplastic rod, and a means for heating said metal rod such that said thermoplastic rod melts along the length of said thermoplastic rod, thereby fusing said receiver of the FRP module with said inserter of said adjacent FRP module;

wherein the FRP module is made of two or more layers of multi-axial fiber reinforced fabric adhered together by a resin matrix, said layers of fabric being continuous throughout the entire shape of the FRP module.

12. The FRP module according to claim 11, wherein the length of said thermoplastic rod is about the length of the FRP module.

13. The FRP module according to claim 10, wherein said means for reinforcing comprises an adhesive bond between said receiver of the FRP module and said inserter of said first adjacent FRP module.

14. The FRP module according to claim 3, wherein the FRP module is manufactured by a manufacturing process selected from the group consisting of Vacuum Assisted Resin Transfer Molding (VARTM) process, Seeman Composite Resin Infusion Molding Process (SCRIMP), and pultrusion process.

15. A fiber reinforced polymer (FRP) module for a panel, deck, or wall system, comprising:

a top piece having a top face, a length, a width, a thickness, a first end, and a second end;

a bottom piece having a bottom face, a length, a width, a thickness, a first end, and a second end;

a means for supporting said top face a predefined distance from said bottom face, wherein said means for supporting comprises a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces; and a filler in one or more of said one or more internal spaces;

wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module;

wherein the FRP module is made of two or more layers of multi-axial fiber reinforced fabric adhered together by a resin matrix, said layers of fabric being continuous throughout the entire shape of the FRP module.

16. The FRP module according to claim 15, wherein said filler is selected from the group consisting of thermal insulation, noise reduction insulation, and strength and stability enhancement.

17. The FRP module according to claim 3, further comprising an overlay placed over said top face thereby resulting in a uniform wearing surface.

18. The FRP module according to claim 17, wherein said overlay is selected from the group consisting of concrete, asphalt, polymer concrete, and bonded grid anti-skid surface.

19. The FRP module according to claim 3, further comprising one or more exterior FRP composite laminates, grids, plates or fabrics bonded continuously to said top face.

20. The FRP module according to claim 3, further comprising one or more protrusion areas for receiving an overlap of said one or more layers of multi-axial fiber reinforced fabric.

21. The FRP module according to claim 20, wherein said protrusion areas are positioned at high stress areas of the FRP module.

22. A fiber reinforced polymer (FRP) module for a panel, deck, or wall system, comprising:
    a top piece having a top face, a length, a width, a thickness, a first end, and a second end;
    a bottom piece having a bottom face, a length, a width, a thickness, a first end, and a second end; and
    a means for supporting said top face a predefined distance from said bottom face;
    wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module;
    wherein the FRP module is made of two or more layers of multi-axial fiber reinforced fabric adhered together by a resin matrix, said layers of fabric being continuous throughout the entire shape of the FRP module;
    wherein said top piece and said bottom piece are graduated in thickness such that the thickness of the center of said top piece is greater than the thickness of the first end and the second end of said top piece and the thickness of the center of said bottom piece is greater than the thickness of the first end and the second end of said bottom piece.

23. A method for building a panel, deck or wall system, comprising the steps of:
    (a) positioning a fiber reinforced polymer (FRP) module having a top piece with a top face, a length, a width, a thickness, a first end, and a second end, a bottom piece having a bottom face, a length, a width, a thickness, a first end, and a second end, a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces, wherein said fifth intersection is at a point on said first web between said first intersection and said second intersection and said sixth intersection is at a point on said second web between said third intersection and said fourth intersection, wherein said first end of said top face and said first end of said bottom face comprise a receiver having a length and said second end of said top face and said second end of said bottom face comprise an inserter having a length, wherein said FRP module is adapted to be pressure fit to a first adjacent FRP module and a second adjacent FRP module, such that said receiver of said FRP module interlocks with an inserter of said first adjacent FRP module and said inserter of said FRP module interlocks with a receiver of said second adjacent FRP module, and wherein said FRP module is made of two or more layers of multi-axial fiber reinforced fabric adhered together by a resin matrix, said layers of fabric being continuous throughout the entire shape of said FRP module; and
    (b) inserting an inserter of a second FRP module into said receiver of said FRP module.

24. The method according to claim 23, further comprising the step of:
    (c) applying an adhesive between said receiver of said FRP module and said inserter of said second FRP module.

25. The method according to claim 23, further comprising the step of:
    (c) reinforcing an interlocking of said receiver of said FRP module with said inserter of said second FRP module.

26. A method for building a panel, deck or wall system, comprising the steps of:
    (a) positioning a first fiber reinforced polymer (FRP) module having a top piece with a top face, a length, a width, a thickness, a first end, and a second end, a bottom piece having a bottom face, a length, a width, a thickness, a first end, and a second end, a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces, wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module, and wherein the FRP module is made of two or more layers of multi-axial fiber reinforced fabric adhered together by a resin matrix, said layers of fabric being continuous throughout the entire shape of the FRP module;
    (b) inserting an inserter of a second FRP module into said receiver of said first FRP module; and
    (c) reinforcing an interlocking of said receiver of said first FRP module with said inserter of said second FRP module, wherein said reinforcing of said step (c) comprises the steps of:
        (c.1) positioning a thermoplastic rod having a length inbetween said receiver of said first FRP module and said inserter of said second FRP module;
        (c.2) contacting a metal rod with said thermoplastic rod; and
        (c.3) heating said metal rod such that said thermoplastic rod melts along the length of said thermoplastic rod, thereby fusing said receiver of said first FRP module with said inserter of said second FRP module.

27. The method according to claim 26, wherein the length of said thermoplastic rod is equal to the length of the FRP module.

28. A method for building a panel, deck or wall system, comprising the steps of:
    (a) positioning a first fiber reinforced polymer (FRP) module having a top piece with a top face, a length, a width, a thickness, a first end, and a second end, a bottom piece having a bottom face, a length, a width, a thickness, a first end, and a second end, a first web connecting said top piece at a first intersection to said bottom piece at a second intersection, a second web a predefined distance from said first web connecting said top piece at a third intersection to said bottom piece at a fourth intersection, and one or more diagonal webs diagonally connecting said first web at a fifth intersection to said second web at a sixth intersection, thereby defining one or more internal spaces, wherein said first end of said top face and said first end of said bottom face comprise a receiver and said second end of said top face and said second end of said bottom face comprise an inserter, such that said receiver of the FRP module interlocks with an inserter of an adjacent FRP module and said inserter of the FRP module interlocks with a receiver of said adjacent FRP module, and wherein the FRP module is made of two or more layers of multi-axial fiber reinforced fabric adhered together by a resin matrix, said layers of fabric being continuous throughout the entire shape of the FRP module;

(b) inserting an inserter of a second FRP module into said receiver of said first FRP module; and (c) filling a filler in one or more of said one or more internal spaces.

29. The method according to claim 28, wherein said filler is selected from the group consisting of thermal insulation, noise reduction insulation, and strength stability enhancement.

30. The method according to claim 23, further comprising the step of:

(c) placing an overlay over said top face thereby resulting in a uniform wearing surface.

31. The method according to claim 30, wherein said overlay is selected from the group consisting of concrete, asphalt, polymer concrete, and bonded grit anti-skid surface.

32. The method according to claim 23, further comprising the step of:

(c) applying one or more exterior FRP composite laminates, grids, plates or fabrics bonded continuously to said top face.

33. The method according to claim 23, further comprising the step of:

(c) positioning one or more support beams underneath said FRP module and said second FRP module such that said support beams are placed parallel to a flow of traffic and that said FRP module and said second FRP module are placed perpendicular to said support beams.

34. The FRP module according to claim 3, wherein the length of each said receiver and said inserter is within a range of about 15 percent to about 25 percent of said length of said top piece.

35. The FRP module according to claim 3, wherein said fifth intersection is located on said first web at a distance from said first intersection or said second intersection equal to about ten percent of said length of said first web.

36. The FRP module according to claim 35, wherein said sixth intersection is located on said second web at a distance from said third intersection or said fourth intersection equal to about ten percent of said length of said second web.

37. The FRP module according to claim 3, wherein said inserter comprises one or more recessed portions and said receiver comprises one or more interior recessed portions such that said inserter and said receiver form a tongue and groove joint when interlocked.

38. The FRP module according to claim 3, wherein said top piece and said bottom piece are graduated in thickness such that the thickness of the center of said top piece is greater than the thickness of the first end and the second end of said top piece and the thickness of the center of said bottom piece is greater than the thickness of the first end and the second end of said bottom piece.

39. The FRP module according to claim 1, wherein said top piece and said bottom piece are graduated in thickness such that the thickness of the center of said top piece is greater than the thickness of the first end and the second end of said top piece and the thickness of the center of said bottom piece is greater than the thickness of the first end and the second end of said bottom piece.

* * * * *